US006442607B1

(12) United States Patent
Korn et al.

(10) Patent No.: US 6,442,607 B1
(45) Date of Patent: Aug. 27, 2002

(54) CONTROLLING DATA TRANSMISSIONS FROM A COMPUTER

(75) Inventors: Rodney A. Korn, Hillsboro, OR (US); Gregory H. Kisor, Portland, OR (US); Richard C. Calderwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/130,244

(22) Filed: Aug. 6, 1998

(51) Int. Cl.[7] ............................................. G06F 17/30
(52) U.S. Cl. ..................... 709/225; 709/224; 709/229; 713/153; 713/201
(58) Field of Search ................... 713/153, 166, 713/200, 201, 154; 707/529, 530, 531, 507; 710/67; 709/224, 225, 229

(56) References Cited

U.S. PATENT DOCUMENTS

| | | | | |
|---|---|---|---|---|
| 5,126,728 A | * | 6/1992 | Hall | 340/825.3 |
| 5,345,553 A | * | 9/1994 | Busboom et al. | 345/332 |
| 5,734,749 A | * | 3/1998 | Yamada et al. | 382/187 |
| 5,781,632 A | * | 7/1998 | Odom | 380/24 |
| 5,835,722 A | * | 11/1998 | Bradshaw et al. | 709/225 |
| 5,850,446 A | * | 12/1998 | Berger et al. | 380/24 |
| 5,922,073 A | * | 7/1999 | Shimada | 713/200 |
| 5,923,756 A | * | 7/1999 | Shambroom | 380/21 |
| 5,931,948 A | * | 8/1999 | Morisawa et al. | 713/202 |
| 5,960,080 A | * | 9/1999 | Fahlman et al. | 380/4 |
| 6,002,767 A | * | 12/1999 | Kramer | 380/24 |
| 6,064,979 A | * | 5/2000 | Perkowski | 705/26 |
| 6,065,120 A | * | 5/2000 | Laursen et al. | 713/201 |
| 6,115,821 A | * | 9/2000 | Newby et al. | 713/200 |
| 6,128,735 A | * | 10/2000 | Goldstein et al. | 713/166 |
| 6,134,661 A | * | 10/2000 | Topp | 713/200 |
| 6,199,079 B1 | * | 3/2001 | Gupta et al. | 707/507 |

* cited by examiner

Primary Examiner—Zarni Maung
Assistant Examiner—Abdullahi E. Salad
(74) Attorney, Agent, or Firm—Trop, Pruner & Hu, P.C.

(57) ABSTRACT

A method includes receiving a stream of data in a computer for transmission from the computer. A determination is made whether a portion of the stream of data indicates personal information. Based on the determination, action is automatically taken to control transmission of the portion of the stream. The method may be performed, for example, by a processor of the computer.

31 Claims, 5 Drawing Sheets

CONTROLLING DATA TRANSMISSIONS FROM A COMPUTER

BACKGROUND

The invention relates to controlling data transmissions from a computer.

Personal computers are being used in an ever-increasing number of applications. For example, a consumer may use the computer to shop over the Internet. In a typical Internet shopping transaction, the consumer may select one or more items from an online catalog. To pay for the selected items, the consumer may use the computer to transmit personal information (a credit card number, for example) to a server that maintains the online catalog.

The computer typical executes an Internet browser application program (Microsoft® Internet Explorer® or Netscape® Navigator®, as examples) to communicate with servers of the Internet. However, the browser application program may use an unsecure protocol (a hypertext transmission protocol (http), for example) when communicating with the servers, and as a result, an unauthorized party may be able to intercept personal information that is transmitted using the unsecure protocol. To prevent this from occurring, the browser application program may use a secure protocol, such as the protocol used by a secure sockets layer (SSL). When the browser application program uses a secure protocol, the letters "https" (instead of the letters "http") appear in the universal resource locator (URL), or Internet address, that is displayed by the browser application program.

The consumer may choose not to use the computer to transmit personal information when the computer is using an unsecure protocol. However, the user may not know which type of protocol is being used by the computer and thus, may unintentionally use the computer to transmit the personal information. Unintentional transmission of the personal information may also occur, for example, when an unauthorized user (a child of the consumer, for example) has access to both the personal information and the computer.

Thus, there is a continuing need for a computer system that minimizes unintended transmissions of personal information.

SUMMARY

In one embodiment, a method includes receiving a stream of data in a computer for transmission from the computer. A determination is made whether a portion of the stream of data indicates personal information. Based on the determination, action is automatically taken to control transmission of the portion of the stream.

In another embodiment, a computer system includes an input device, an output device and a processor. The input device generates a stream of data. The processor determines whether a portion of the stream of data indicates personal information and based on the determination, takes action to control transmission of the portion of the stream by the output device.

DETAILED DESCRIPTION

Figure 1:
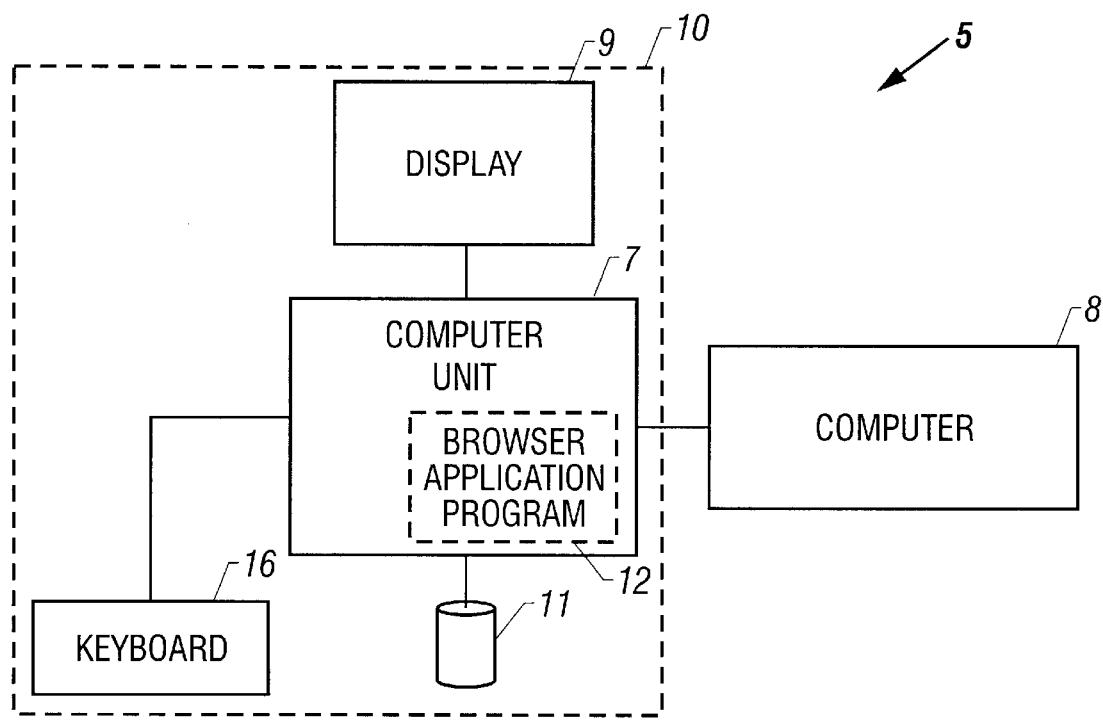
FIG. 1 is a block diagram of a network of computers.

Referring to FIG. 1, an embodiment 5 of a network (the Internet, for example) in accordance with the invention includes a computer 10 (a personal computer, for example) that executes a browser application program 12 to communicate with another computer 8 (a computer that is part of the Internet, for example). In this communication, the computer 8 may request personal information items (a credit card number, a residence address, or a phone number, as examples) from a user of the computer 10, and in response, the user may type keystrokes on a keyboard 16 in a sequence that indicates the personal information items. This sequence of keystrokes forms a stream of data that a typical computer may transmit to the computer 8 in response to the request.

Figure 2:
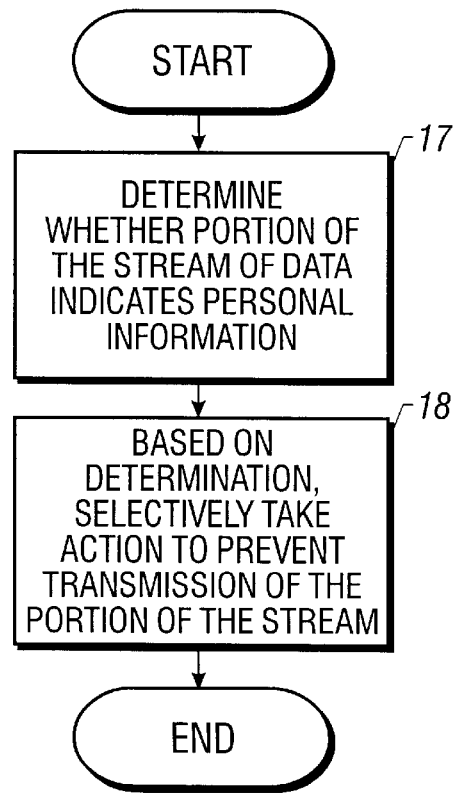
FIGS. 2, 4 and 5 are flow diagrams of routines executed by a computer of FIG. 1.

However, unlike typical computers, the computer 10 may scan all data that is awaiting transmission by the computer 10. Referring to FIG. 2, in particular, the computer 10 may determine (block 17) whether a portion of the stream indicates personal information and based on the determination, selectively take action (block 18) to prevent transmission of the portion of the stream. Thus, the computer 10 takes measures to prevent unintentional transmissions of personal information items.

The advantages of preventing unintentional transmissions of personal information items may include one or more of the following: personal information items may not be obtained by a third party; unauthorized transmissions of personal information items may be prevented; and harm caused by unauthorized uses of the computer may be minimized.

Referring back to FIG. 1, the action taken by the computer 10 (after determining a stream to be transmitted indicates one or more personal information items) may include, in some embodiments, determining whether the browser application program 12 is using a secure protocol to transmit data. For example, in some embodiments, the computer 10 may automatically determine whether the browser application program 12 is causing the computer 10 to use an encryption protocol, such as a protocol used by a secure sockets layer (SSL), in communications with other computers. However, in other embodiments, instead of automatically making this determination, the computer 10 may prompt the user to indicate the type of protocol being used by the browser application program 12.

If the browser application program 12 is causing the computer 10 to transmit the data using a secure protocol, then, in some embodiments, the computer 10 may allow the data indicating personal information items to be transmitted to the computer 8. However, in other embodiments, even if the browser application program 12 is causing the computer 10 to transmit data using a secure protocol, the computer 10 may take steps to prevent the transmission of the data that indicates the personal information items.

In different embodiments, the computer 10 may take actions that are different from and/or supplement the actions described above. For example, when a personal information item is about to be transmitted, the computer 10 may request (via a graphical interface on a display 9, for example) for the user of the computer 10 to authorize the transmission of the personal information item. The authorization may require that the user enter a private, predetermined authorization code or click on an "Ok" button on a graphical interface, as examples. In some embodiments, the action taken by the computer 10 may include redacting the data that indicates personal item(s) from the stream to be transmitted by the computer 10.

Figure 3:
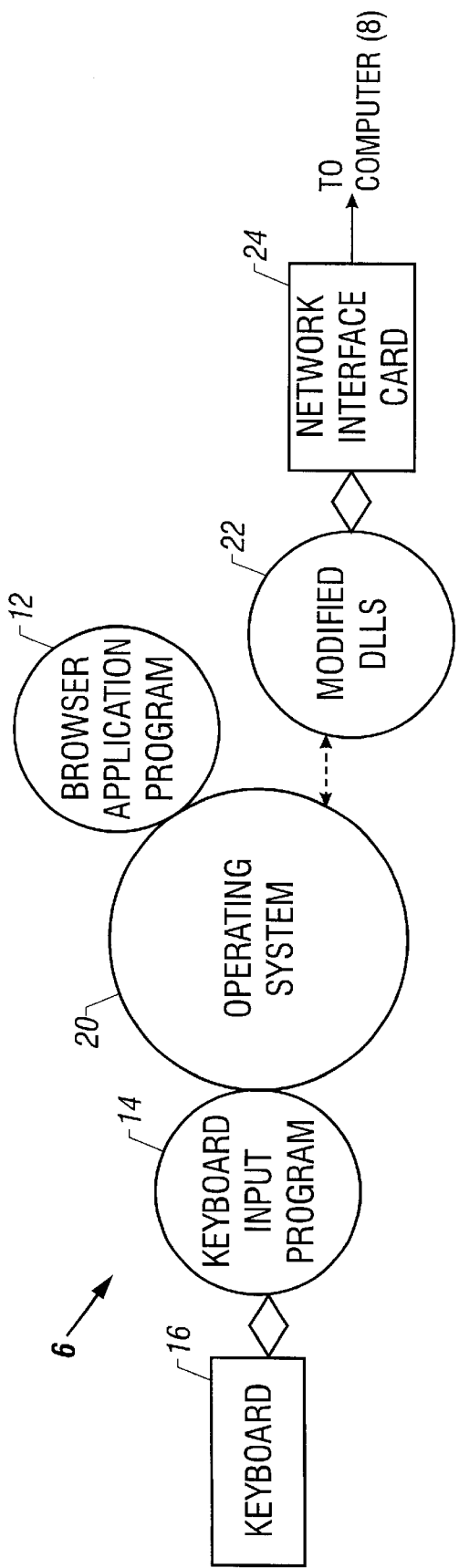
FIG. 3 is an illustration of a software architecture of the computer.

Referring to FIG. 3, to take the above-described actions, the computer 10, in some embodiments, may execute a keyboard input program 14 to intercept a stream of keystroke data (i.e., data that indicates keys that have been pressed on the keyboard 16) before the keystroke data reaches an operating system 20 (a Windows® operating system, for example). The interception of the stream of keystroke data in this context generally refers to preventing the stream from being processed by the computer 10 when the computer 10 is executing code (code of the operating system 20, for example) other than the code of the keyboard input program 14. As a result of this interception, the keyboard input program 14 censures the stream of keystroke data.

By preventing the keystroke data from reaching the operating system 20, the keyboard input program 14 also prevents the keystroke data from reaching the browser application program 12. In this manner, by temporarily intercepting, or trapping, the keystroke data, the computer 10 may scan the keystroke data for a sequence that indicates personal information item(s) before the data is passed on to the browser application program 12. As a result, if during execution of the keyboard input program 14, the computer 10 determines the keystroke data includes a personal information item, the computer 10 may take actions to prevent transmission of the data that indicates the personal information item from being processed by the browser application program 12, as described below.

The keyboard input program 14 may receive the keystroke data in an ordered sequence that reflects the order in which the keystrokes are typed on the keyboard 16. In some embodiments, the keyboard input program 14 causes the computer 10 to compare the received sequence to predefined sequences, each of which indicates a different personal information item. If a portion of the received sequence matches one of the predefined sequences, then a personal information item is identified. For example, a credit card number might be "1234-5678-1234-5678." If a portion of the received sequence indicates "1234-5678-1234-5678," then the credit card number is identified, and the computer 10 (under control of the keyboard input program 14) takes action to prevent transmission of the keystroke data that indicates the personal information item, as described below.

The predefined sequences might be entered by a user and stored in a data file on a hard disk drive 11 (see FIG. 1) of the computer 10. When the computer 10 initializes the keyboard input program 14 for execution, the computer 10 may, for example, store an image of the data file as a memory mapped file in a memory of the computer 10.

In some embodiments, the computer 10 (under control of the keyboard input program 14) may identify the personal information items by comparing the received sequence of keystroke data to predefined patterns, each of which may indicate a different personal information item. For example, a credit card number may follow the pattern "XXXX-XXXX-XXXX-XXXX," where each "X" indicates a single digit number from zero to nine. In this manner, if a portion of the received keystroke sequence indicates the predefined pattern, then one of the personal information items is identified.

Like the predefined sequences, the predefined patterns may be defined by the user and stored in a data file on the hard disk drive 11, and the computer 10 may store an image of the data file in a memory of the computer 10 as a memory mapped file.

In some embodiments, the predefined patterns and sequences may not indicate a particular personal information item in its entirety. For example, the predefined sequence that the computer 10 uses to indicate a credit card number of "1234-5678-1234-5678" might be a sequence that indicates a portion of the number, such as "1234-5678-12." In this manner, a personal information item may be identified before the entire item is typed into the computer 10.

For purposes of processing the keystroke data, the keyboard input program 14 may cause the computer 10 to store a sequence of the most recently received keystroke data. This stored sequence may be of a sufficient size to identify the personal information item formed from the largest number of keystrokes.

In some embodiments, the keyboard input program 14 may cause the computer 10 to store the keystroke data in a first-in-first-out (FIFO) buffer that is about the same size as the stored sequence. In this manner, the computer 10 may prevent all data that is part of a personal information item from being sent to the browser application program 12.

However, by buffering the keystroke data as described above, the typed keystrokes do not appear (in a window controlled by the browser application program 12, for example) as the user types the data. Thus, in some embodiments, the keyboard input program 14 causes the computer 10 to allow the keystroke data to pass through to the browser application program 12 until the computer 10 identifies a personal information item.

Figure 4:
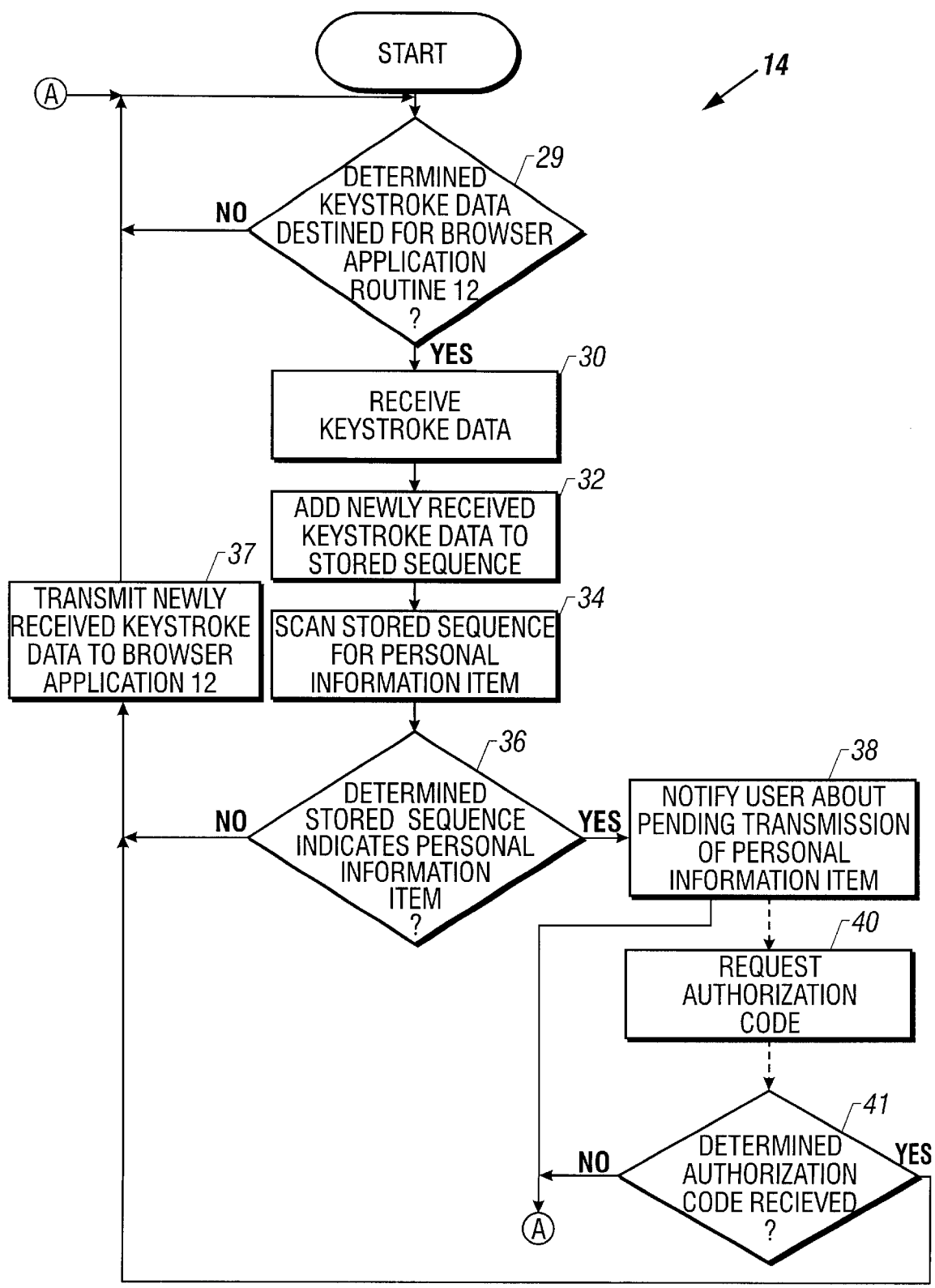

Referring to FIG. 4, in some embodiments, the execution of the keyboard input program 14 causes the computer 10 to initially determine (diamond 29) whether keystroke data from the keyboard 16 is destined for the browser application program 12. For example, if the operating system 20 is a Windows® operating system, then the computer 10 determines whether the window being used by the browser application program 12 is active, or has input focus. In this manner, if this window has input focus, then the operating system 20 routes the keystroke data to the browser application program 12. If the keystroke data is not destined for the browser application program 12, then the computer 10 continues to monitor (diamond 29) for this occurrence.

Otherwise, the keyboard input program 14 causes the computer 10 to receive (block 30) all keystroke data that is entered by the user. To accomplish this, the keyboard input program 14 may, for example, include a series of calls (application programming interface (API) calls) to the operating system 20 which permits the keyboard input program 14 (when being executed by the computer 10) to trap all incoming keystroke data.

Next, the keyboard input program 14 may cause the computer 10 to add (block 32) the newly received keystroke data to the stored sequence of the most recently received keyboard data. As an example, the computer 10 may store data for the twenty most recently received keystrokes. The computer 10 scans (block 34) the stored sequence to identify a personal information item.

If the computer 10 determines (diamond 36) that the stored sequence does not indicate a personal information item, the computer 10 transmits the newly received data to the browser application program 12 and returns to step 29. The newly received data may indicate a portion of a sequence of keystrokes that ultimately may indicate a personal information item. However, in some embodiments, the computer 10 allows the newly received data to be transmitted to the browser application program 12 unless the newly represents the last keystroke of the personal information.

If the computer 10 determines (diamond 36) that the stored sequence does indicate a personal information item, the computer 10 may then notify (block 38) the user about the pending transmission of the personal information item. In some embodiments, the computer 10 redacts (block 42) the newly received keystroke data (that indicates part of the personal information item) and returns to block 30 without sending the newly received keystroke data to the browser application program 12.

However, in other embodiments, the computer 10 does not automatically prevent the newly received data from reaching the browser application program 12. Instead, the computer 10 first requests (block 40) an authorization code from the user. If the computer 10 determines (diamond 41)

that the authorization code has been received, the computer 10 then transmits (block 44) the newly received data to the browser application program 12. Otherwise, if the code is not received, the computer 10 redacts (block 42) the newly received data from the stored sequence and returns to step 29. The authorization code may not be received if, as examples, the user enters the wrong code or clicks a mouse on a "Cancel" button on a visual interface (a graphics interface on the display 9, for example).

Referring to back to FIG. 3, instead of trapping the input data stream from the keyboard 16, the computer 10 may alternatively trap the output communication data stream that is generated by the execution of the browser application program 12. In this manner, one or more existing dynamic link libraries (DLLs) of the computer 10 may be modified (to form modified DLLs 22) to prevent personal information items from being transmitted by the computer 10.

The DLLs 22 perform such functions as interfacing the operating system 20 to a network interface card 24 and establishing a protocol for communication with the server 8. For example, the DLLs 22 may implement a transmission control protocol/internet protocol (TCP/P) layered stack. One of the layers of the TCP/IP stack is a data link layer which, among other functions, organizes the data to be transmitted into packets. In the computer 10, the data link layer may be modified to monitor the outgoing communication stream for data that indicates personal information items.

As an example, one way to modify the data link layer for a Windows® based operating system is to modify a DLL called WININET.DLL which is used by the operating system 20 to implement the data link layer. For example, the modified DLL may redact an identified personal information item before the item is assembled into one or more packets.

Figure 5:
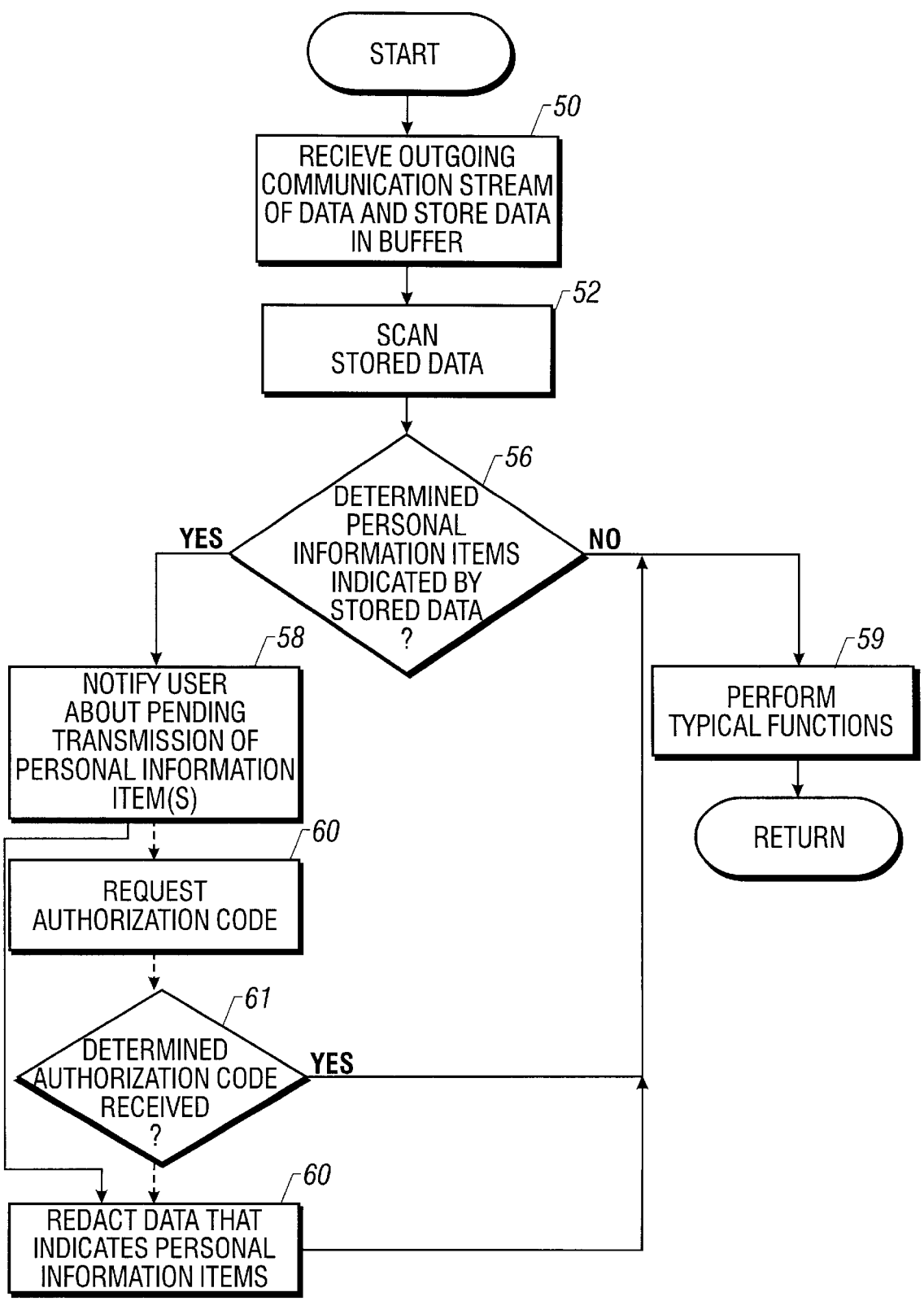

In this manner, referring to FIG. 5, the modified DLL may cause the computer 10 to receive (block 50) the outgoing data communication stream and temporarily store the data in a buffer. The computer 10 scans (block 52) the stored data to determine (diamond 56) if the stored data indicates one or more personal information items. If not, the computer 10 allows (block 59) all of the data in the buffer be assembled into packets, as is typical. However, if the computer 10 determines (diamond 56) that the stored data does indicate one or more personal information items, the computer 10 may then notify (block 58) the user about the pending transmission of the personal information. In some embodiments, the computer 10 then redacts (block 62) the data that indicates the personal information item(s) from the buffer to prevent the transmission of the item(s) and then allows (block 59) the remaining data in the buffer to be assembled into packets.

However, in other embodiments, the computer 10 does not automatically redact the data that indicates the personal information item(s). Instead, the computer 10 may request (block 60) an authorization code from the user. If the computer 10 determines (diamond 61) that the authorization code has been received, the computer 10 allows (block 59) all of the data in the buffer to be assembled into packets. Otherwise, if the authorization code is not received control proceeds to block 62.

Figure 6:
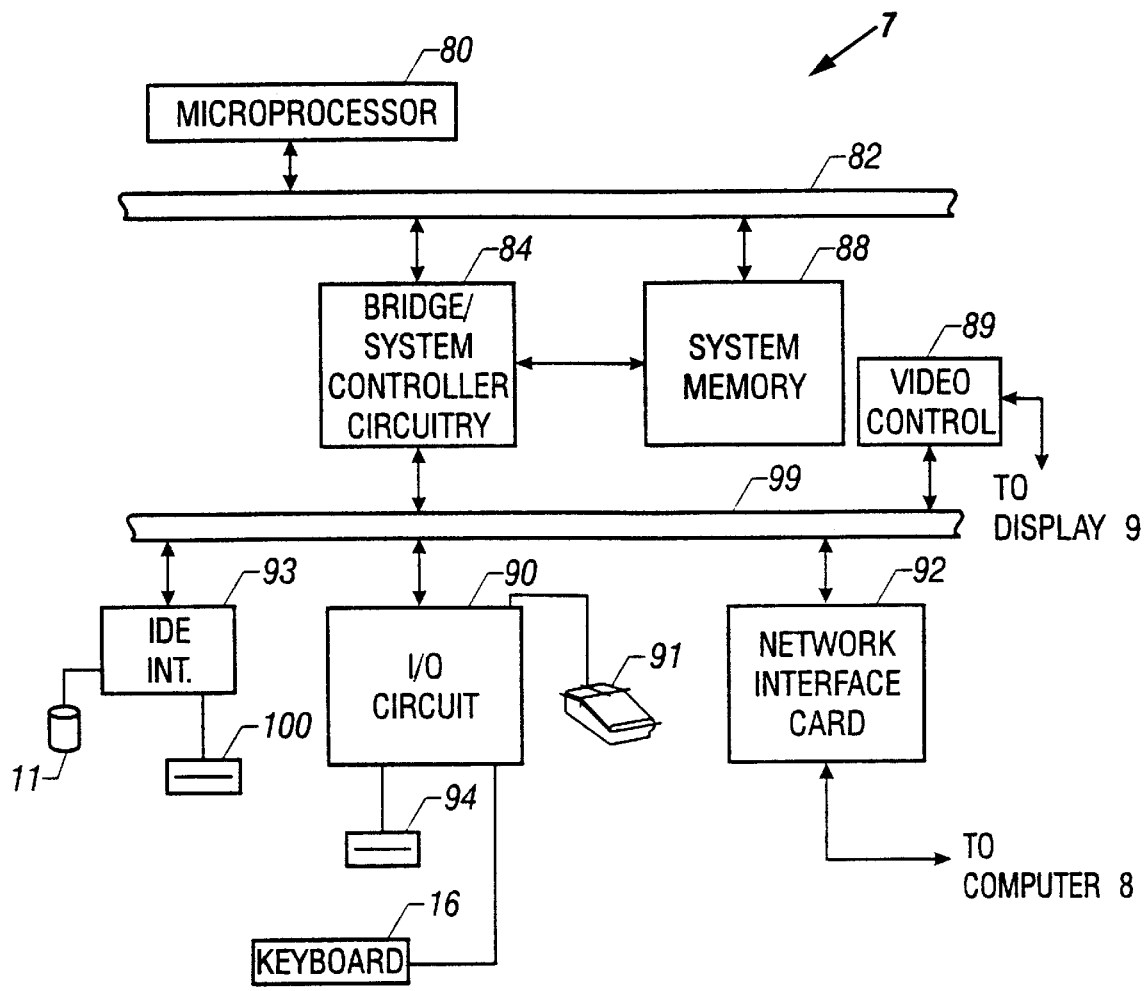
FIG. 6 is a block diagram of the computer.

Referring to FIG. 6, a computer unit 7 of the computer 10 may include a microprocessor 80 that may either execute the keyboard routine 14 or one or more modified DLLs to cause the computer 10 to generate a stream of data in the computer 10 for transmission to the other computer 8; determine whether a portion of the stream of data indicates personal information, and based on the determination, selectively take action to prevent transmission of the portion of the stream. The keyboard input program 14 and/or the routines 22 might be stored in a memory 88 of the computer unit 7.

The memory 88, the microprocessor 80 and the bridge/system controller circuitry 84 may all be coupled to a local bus 82. The circuitry 84 also interfaces the host bus 82 to a downstream bus 99 which is coupled to an I/0 controller 90 and a network interface card 92, as examples. The I/O controller 90 might be receive input from the keyboard 16 and a mouse 91 and control operations of a floppy disk drive 94. The computer unit 7 may also have, as an example, a CD-ROM drive 100. The CD-ROM drive 100 and the hard disk drive 11 might be controlled by an Intelligent Device Electronics (IDE) interface 93 that is coupled to the bus 99. The computer unit 7 may also include a video controller 89 to control the display 9.

Other embodiments are within the scope of the following claims. For example, the routines discussed above may be implemented by a plug-in to the browser application program 12. In some embodiments, the browser application program 12 may also be modified to perform the above-described functions.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising;
receiving a stream of keystroke data in a first computer for transmission from the first computer;
comparing the keystroke data to at least one predetermined pattern of arbitrary characters indicative of a personal information item to determine whether a portion of the stream of keystroke data indicates the personal information item; and
based on the determination, automatically taking action to control transmission of the portion of the stream.

2. The method of claim 1, wherein the stream is for transmission to a second computer.

3. The method of claim 2, wherein the second computer comprises a server.

4. The method of claim 1, further comprising:
using a keyboard of the first computer to generate the stream of keystroke data.

5. The method of claim 1, wherein the act of taking action includes:
prompting a user to indicate whether transmission of the portion is desired if the portion indicates personal information.

6. The method of claim 1, wherein the act of taking action includes:
removing the portion from the stream of keystroke data if the portion indicate personal information.

7. The method of claim 1, further comprising:
intercepting the stream of keystroke data before the stream is processed by execution of an operating system.

8. The method of claim 1, wherein at least one of the personal information items comprises a credit card number.

9. A computer system comprising:
an input device to generate a stream of keystroke data;
an output device; and
a processor to:
compare the keystroke data to at least one predetermined pattern of arbitrary characters indicative of a personal information item to determine whether a portion of the stream of keystroke data indicates the personal information item, and based on the determination, take action to control transmission of the portion of the stream by the output device.

10. The computer system of claim 9, wherein the input device comprises a keyboard.

11. The computer system of claim 9, wherein the action taken by the processor includes prompting a user to indicate whether transmission of the portion is desired if the portion indicates the personal information.

12. The computer system of claim 9, wherein the action taken by the processor includes a removal of the portion from the stream of data if the portion indicates the personal information.

13. The computer system of claim 9, wherein the processor interacts with the output device to transmit the portion if the portion does not indicate the personal information.

14. The computer system of claim 9, wherein at least one of the personal information items comprises a credit card number.

15. An article comprising a computer readable storage medium storing instructions to cause a computer to:

receive a stream of keystroke data in a first computer for transmission to a second computer;

compare the keystroke data to at least one predetermined pattern of arbitrary characters indicative of a personal information item to determine whether a portion of the stream of keystroke data indicates the personal information item; and based on the determination, take action to control transmission of the portion of the stream.

16. The article of claim 15, wherein the action taken by the computer includes prompting a user to determine whether transmission of the portion is desired if the portion indicates personal information.

17. The article of claim 15, wherein the action taken by the computer includes a removal of the portion from the stream of data if the portion indicates personal information.

18. The article of claim 15, further comprising instructions to cause the computer to intercept the stream of keystroke data before the stream is processed by execution of an operating system.

19. The article of claim 15, wherein at least one of the personal information items comprises a credit card number.

20. A method comprising:

monitoring a stream of keystroke data to determine whether a portion of the stream of keystroke data indicates a pattern of arbitrary characters indicative of personal information; and selectively regulating access of the keystroke data by a browser application program based on the determination.

21. The method of claim 20, further comprising:

comparing the keystroke data to predetermined patterns of keystroke data to make the determination.

22. The method of claim 20, further comprising:

prompting a user to indicate whether transmission of the portion is desired if the portion indicates personal information.

23. The method of claim 20, further comprising:

removing the portion from the stream of keystroke data if the portion indicates personal information.

24. The method of claim 20, further comprising:

intercepting the stream of keystroke data before the stream is processed by execution of an operating system.

25. The method of claim 20, wherein the personal information comprises a credit card number.

26. An article comprising a machine readable storage medium storing instructions to cause a processor to:

monitor a stream of keystroke data to determine whether a portion of the stream of keystroke data indicates a pattern of arbitrary characters indicative of personal information; and selectively regulate access of the keystroke data by a browser application program based on the determination.

27. The article of claim 26, the medium storing instructions to cause the processor to:

compare the keystroke data to predetermined patterns of keystroke data to make the determination.

28. The article of claim 26, the medium storing instructions to cause the processor to:

prompt a user to indicate whether transmission of the portion is desired if the portion indicates personal information.

29. The article of claim 26, the medium storing instructions to cause the processor to:

remove the portion from the stream of keystroke data if the portion indicates personal information.

30. The article of claim 26, the medium storing instructions to cause the processor to:

intercept the stream of keystroke data before the stream is processed by execution of an operating system.

31. The article of claim 26, wherein the personal information comprises a credit card number.

* * * * *

UNITED STATES PATENT AND TRADEMARK OFFICE
CERTIFICATE OF CORRECTION

PATENT NO. : 6,442,607 B1
DATED : August 27, 2002
INVENTOR(S) : Rodney A. Korn, Gregory H. Kisor and Richard C. Calderwood It is certified that error appears in the above-identified patent and that said Letters Patent is hereby corrected as shown below:

Column 6,
Line 52, "indicate" should be -- indicates --.

Signed and Sealed this

Fourteenth Day of January, 2003

JAMES E. ROGAN
*Director of the United States Patent and Trademark Office*